United States Patent

[11] 3,563,499

[72] Inventor James E. Dueweke
Alexandria, Va.
[21] Appl. No. 791,285
[22] Filed Jan. 15, 1969
[45] Patented Feb. 16, 1971
[73] Assignee The United States of America, as represented by the Secretary of the Navy

[54] MECHANISM TO TRANSFER ENGINE TORQUE AND CONTROL MOTION ACROSS HELICOPTER ROTOR VIBRATION ISOLATOR
3 Claims, 2 Drawing Figs.

[52] U.S. Cl. .................................................. 244/17.27;
74/497; 244/17.25
[51] Int. Cl. .................................................. B64c 27/74
[50] Field of Search ........................................ 244/17.27,
17.25, 17.11; 416/168, 159, 131; 74/497, 496, 491, 469; 248/(Inquired)

[56] References Cited
UNITED STATES PATENTS
| | | | |
|---|---|---|---|
| 2,318,260 | 5/1943 | Sikorsky | 244/17.25UX |
| 2,385,881 | 10/1945 | Peterson | 244/17.25UX |
| 2,428,200 | 9/1947 | Campbell | 244/17.25UX |
| 2,506,960 | 5/1950 | Hensley | 74/469 |
| 2,739,769 | 3/1956 | Rogers | 244/17.27 |
| 2,761,635 | 9/1956 | Hiller, Jr. et al. | 244/17.27 |
| 3,095,931 | 7/1963 | Peiffer et al. | 416/159X |
| 3,163,378 | 12/1964 | Balke et al. | 244/17.27 |
| 3,199,601 | 8/1965 | Dean et al. | 74/469X |

FOREIGN PATENTS
| | | | |
|---|---|---|---|
| 1,009,222 | 3/1952 | France | 244/17.27 |

Primary Examiner—Milton Buchler
Assistant Examiner—Paul E. Sauberer
Attorneys—Edgar J. Brower, Arthur L. Branning and Thomas O. Watson, Jr.

ABSTRACT: A helicopter rotor is attached to a structural member which is in turn mounted on an airframe by vibration isolators which enable the rotor and structural member to vibrate in a vertical plane and do not transmit these vibrations to the airframe. A linkage system having one bell crank pivoted on the structural member and another bell crank pivoted on the airframe is used to transfer control motion to the helicopter rotor with a minimum of interference from the vibration of the rotor and structural member. Universal joints are used to transfer engine torque from the engine mounted on the airframe to the vibrating rotor.

PATENTED FEB 16 1971

3,563,499

INVENTOR
JAMES E. DUEWEKE

ATTORNEY

MECHANISM TO TRANSFER ENGINE TORQUE AND CONTROL MOTION ACROSS HELICOPTER ROTOR VIBRATION ISOLATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention relates to rotor drives and controls and, more particularly, to means for transferring drive and control motion to a vibrating rotor with a minimum of interference from the vibration.

2. Description of the Prior Art

In the prior art various arrangements have been devised to minimize the effect of helicopter rotor vibration upon the helicopter airframe. For a discussion of the problem and various proposed solutions the following U.S. Pat. Nos. may be consulted: 2,615,657 to Young et al., 3,163,378 to Balke et al.; 3,298,443 to Burkam et al. and 3,322,379 to Flannelly. The solutions proposed normally involve interposing a vibration absorbing or compensating system between the helicopter airframe and the rotor assembly. This means that the rotor will vibrate relative to the airframe.

In order to control the helicopter, the pitch of the rotor blades are varied by a control rod which is operated from the pilot's compartment of the helicopter and extends normally to a swash plate which is mounted on the helicopter rotor shaft and connected to the rotor blades. When the control rod is operated the swash plate is moved axially of and/or titled relative to the rotor shaft and thereby changes the pitch of the rotor blades. If, as with the above-mentioned vibration insulating arrangements, the rotor assembly and swash plate vibrate relative to the helicopter, it can be seen that the positioning and movement of the control rod and therefore the pitch of the rotor blades will be influenced by the rotor vibration. Further, if the helicopter engine is mounted on the helicopter airframe, it can be seen that it is difficult to transmit rotary motion to the vibrating rotor shaft.

SUMMARY OF THE INVENTION

This invention solves the above-mentioned problems by providing a linkage arrangement for transmitting rotor pitch control motion which minimizes the effect of vertical vibrations of the helicopter rotor relative to the helicopter body. Further, a means for transferring engine torque from the helicopter airframe to the vibrating helicopter rotor is provided.

OBJECTS OF THE INVENTION

It is an object of the present invention to provide a control system for a rotor which minimizes the effect of rotor vibration upon the control.

Another object of the present invention is to provide a system for coupling an engine for transmitting torque to a vibrating rotor.

Other objects, advantages and novel features of the present invention will become apparent from the following detailed description of the invention when considered in conjunction with the accompanying drawing.

DESCRIPTION OF THE PREFERRED EMBODIMENT

Figure 1:
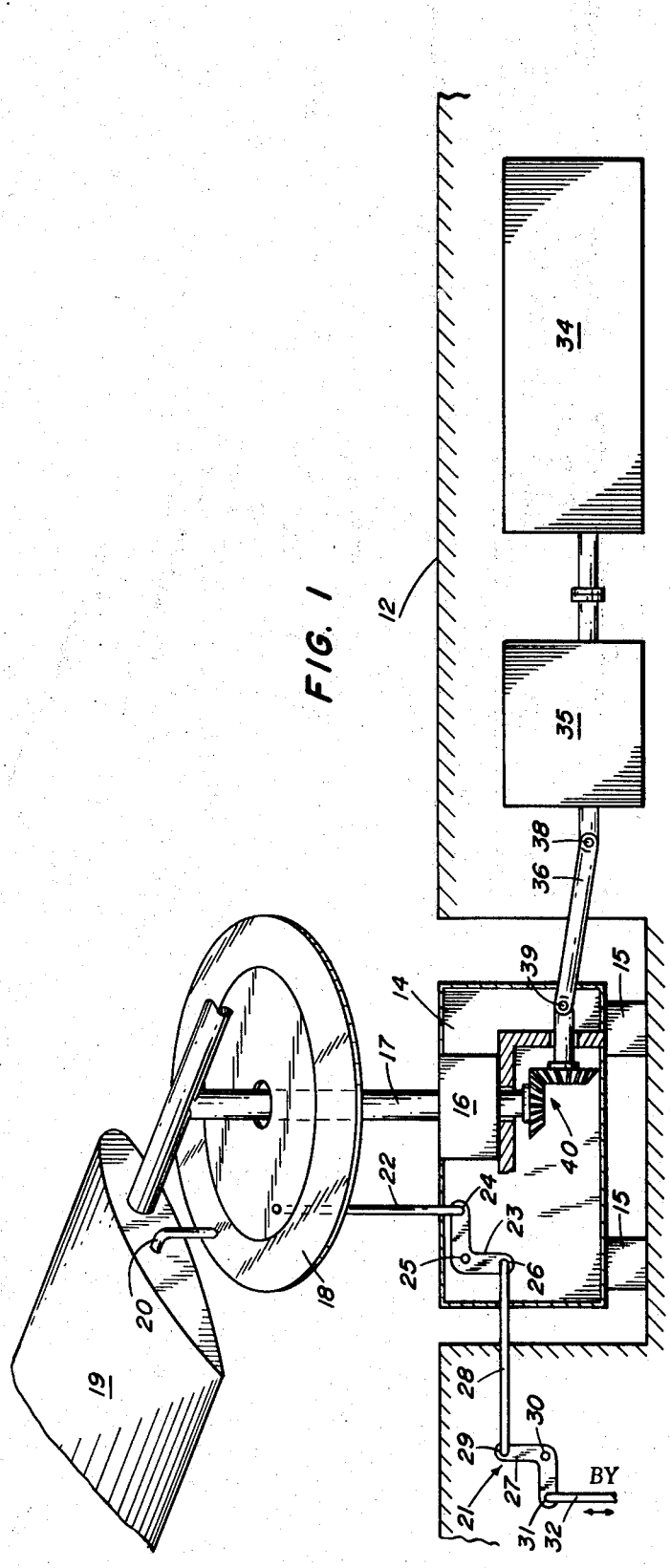
FIG. 1 shows schematically the control linkage and power coupling of the instant invention.

FIG. 1 shows a portion of a helicopter, designated generally by reference numeral 11 and including an airframe 12. A structural member 14 is attached to the airframe by means of vibration isolators 15. The vibration isolators can be of any known type which allows the rotor assembly to vibrate primarily only in a direction longitudinal of said rotor shaft and form no part of this invention. Among the vibration isolators that could be used are the "Dynamic Antiresonant Vibration Isolator" and the "Gyroscopic Vibration Absorber," both manufactured by Kaman Aircraft and the "Electrohydraulic Vibration Isolator" manufactured by Barry Controls. A thrust bearing 16 on the member 14 is used to rotatably connect a rotor shaft 17 to the airframe 12. Mounted for axial and/or tilting displacement on the rotor shaft is a swash plate 18 pivotally interconnected with a rotor blade 19 by a pitch link 20. By moving the swash plate axially of the rotor shaft 17 and/or tilting it the pitch of rotor blade 19 is varied. The swash plate-pitch link arrangement is shown schematically since it forms no part of the invention. Any similar arrangement known in the art could be used.

In order to move the swash plate axially of the rotor shaft and/or tilt it a pitch control linkage is provided, designated generally by reference numeral 21. The linkage is made up of a rod 22 extending generally in the direction of vibratory motion of the rotor assembly having one end connected to the swash plate 18 and pivoted at its other end to one end 24 of a bell crank 23. Bell crank 23 is pivoted on structural member 14 at a point 25. Pivoted to the other end 26 of bell crank 23 is a rod 28 which extends substantially perpendicular to rod 22. The other end of rod 28 is pivoted to one end 29 of a bell crank 27. Bell crank 27 is pivoted to the helicopter airframe 12 at a point 30. Pivoted to the other end 31 of bell crank 27 is a rod 32 which, as shown, extends substantially parallel to rod 22, but can actually extend in any desired direction in which it can be used to pivot bellcrank about point 30. Rod 32 can be actuated to move lengthwise through various known mechanisms by the pilot of the helicopter. This lengthwise movement of rod 32 is transmitted through the control linkage to swash plate 18 which in turn varies the pitch of helicopter rotor blade 19.

Because of the vibration isolators, member 14 and the helicopter rotor vibrate relative to the helicopter in a direction axial of rotor shaft 17. Generally, the total amount of displacement of member 14 relative to the airframe is approximately one-half of an inch. It can be seen that if a control rod extended directly from the swash plate to the pilot's compartment on the airframe the full amount of vibratory motion of the rotor assembly relative to the airframe would be transmitted through the control rod to the controls operated by the pilot, thus making such control of the helicopter rotor uncertain and inaccurate.

Figure 2:
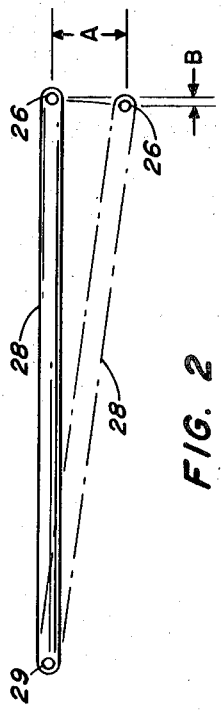
FIG. 2 shows how the linkage of the present invention minimizes the effect of rotor vibration on control motion.

An analysis of FIG. 2 will show how the linkage of the present invention overcomes the above problem. Since the total amount of vertical vibration movement is 0.5 inch, end 26 of rod 28 will vibrate up-and-down around a zero point a distance A of 0.25 inch. If we assume that rod 28 is 3 feet long, the total effect of the vibrational movement on the linkage system, represented by the distance B, is approximately 0.001 inch. It can be seen that if there were a direct control connection from the vibrating rotor assembly to the pilot's cabin, a vertical displacement of the rotor assembly of ± 0.25 inch would cause a corresponding displacement of the control rod. However, with Applicant's linkage system a 0.25 inch displacement the rotor system introduces only a 0.001 inch displacement of the control rod system. In a linkage system such as that shown by Applicant, a 0.001 inch displacement of a control rod system is negligible since the linkage has more play in it than that. It can be seen that the longer rod 28 the less influence the vibration of the rotor assembly relative to the helicopter body will have.

It is clear that the effect of transverse vibration of member 14 will not be eliminated by the linkage system shown. However, with most known vibration isolation systems the vibration of the rotor is confined to a vertical direction and the transverse vibration of the rotor assembly is negligible.

As shown schematically in FIG. 1, an engine 34 and a transmission 35 are mounted on the helicopter airframe. Rotary motion is transmitted to the rotor shaft 17 by a drive shaft 36. In order to effectively transmit this rotary motion to the vibrating rotor shaft, universal joints 38 and 39 are provided. At the junction between the drive shaft and the rotor shaft a bevel gear assembly 40 is provided. With one universal joint being disposed in the drive shaft adjacent the airframe and one adjacent the vibrating member 14 it is possible to transmit rotary motion to the vibrating rotor shaft 17.

Many alterations and modifications may be made in light of the above teachings. For example, Applicant's concept is not limited to use in helicopters but can be used in any environment where a vibrating rotor assembly must be driven from a stationary motor or motion must be transmitted from a stationary position to vibrating position without interference from the vibrations.

I claim:

1. A system for transmitting motion from a relatively stationary body to a body vibrating primarily in one direction while minimizing the effects of the relative vibration on the motion transmitted, the direction of motion transmitted being in the direction of vibration, said system comprising:
   a first rod;
   a first bell crank pivoted to said relatively stationary body, said first rod having one end pivoted to one end of said first bell crank;
   a second rod having one end pivoted to the other end of said first bell crank;
   a second bell crank pivoted to said vibrating body, said second rod having its other end pivoted to one end of said second bell crank; and
   a third rod pivoted to the other end of said second bell crank and extending in a direction generally perpendicular to said second rod, the direction of said third rod extension further being the direction of primary vibratory movement of said vibrating body, whereby longitudinal motion imparted to said first rod is transmitted to said third rod with minimum effect from the vibration of said vibrating body.

2. The system of claim 1 wherein the other end of said first rod is connected to a helicopter control member and the other end of said third rod is connected to means for varying the pitch of a helicopter rotor blade.

3. In a helicopter, the combination comprising:
   a helicopter airframe;
   a rotor assembly including adjustable pitch rotor blades;
   vibration isolating means for isolating vibrations of said rotor assembly so that they are not transmitted to said airframe;
   a control member for transmitting motions from said airframe to said rotor blades;
   means responsive to said control member for varying the pitch of said rotor blades;
   a first rod connected to and moveable lengthwise by said control member;
   a second rod extending in the direction of primary vibratory rotor motion and connected to said pitch varying means for actuation thereof by lengthwise movement of said second rod; and
   a third rod perpendicular to said second rod and connected to said first and second rods by first and second bellcranks, respectively, said first bellcrank being pivoted to said body and second bell crank to said isolated rotor assembly.